United States Patent [19]

Shahidi et al.

[11] Patent Number: 4,961,617

[45] Date of Patent: Oct. 9, 1990

[54] FIBRE OPTIC WAVEGUIDE ILLUMINATING ELEMENTS

[76] Inventors: Ferrydon Shahidi; Joan Shahidi, both of 2144 A Danforth Ave., Toronto, Canada, M4C 1J9

[21] Appl. No.: 381,954

[22] Filed: Jul. 19, 1989

[51] Int. Cl.⁵ .......................... G02B 6/00; F21V 7/04; G09F 13/00; B29D 11/00
[52] U.S. Cl. ................... 350/96.10; 350/96.24; 350/96.34; 350/96.12; 362/31; 362/32; 362/330; 362/331; 362/355; 40/547; 264/1.5; 264/1.7
[58] Field of Search ............... 350/96.10, 96.12, 96.15, 350/96.11, 96.20, 96.24, 96.22, 96.25, 96.26, 96.30, 96.34; 362/31, 32, 326, 330, 331, 351, 355; 40/542, 546, 547; 264/1.1, 1.5, 1.7

[56] References Cited

U.S. PATENT DOCUMENTS

| | | | |
|---|---|---|---|
| 2,507,909 | 5/1950 | Kaysen | 40/547 X |
| 2,639,528 | 5/1953 | Ochsner | 40/547 X |
| 3,489,482 | 1/1970 | Brill | 350/96.24 X |
| 3,491,245 | 1/1970 | Hardesty | 350/96.10 X |
| 3,781,537 | 12/1973 | Ramsey | 350/96.10 X |
| 3,962,702 | 6/1976 | Kriege | 340/380 |
| 4,141,058 | 2/1979 | Mizohata et al. | 362/32 |
| 4,151,528 | 4/1979 | Grunberger | 362/31 |
| 4,382,272 | 5/1983 | Quella et al. | 362/32 X |
| 4,417,412 | 11/1983 | Sansom | 40/547 |
| 4,422,719 | 12/1983 | Orcutt | 350/96.30 |
| 4,597,030 | 6/1986 | Brody et al. | 362/32 |
| 4,647,152 | 3/1987 | Jeskey | 350/96.24 |
| 4,715,700 | 12/1987 | Daniel | 350/618 |
| 4,802,066 | 1/1989 | Mori | 362/32 |
| 4,845,596 | 7/1989 | Mouissie | 362/32 |
| 4,884,860 | 12/1989 | Brown | 350/96.15 |

FOREIGN PATENT DOCUMENTS

| | | | |
|---|---|---|---|
| 3509663 | 7/1985 | Fed. Rep. of Germany | 362/32 X |
| 1507883 | 4/1978 | United Kingdom | 350/96.24 X |
| 2051447 | 1/1981 | United Kingdom | 350/96.24 X |

*Primary Examiner*—Brian Healy

[57] ABSTRACT

A fibre optic element is disclosed capable of a wide range of uses, including illumination, lighted fixed or variable signs, and decorative applications. The element is formed in one piece of transparent material and has one or more generally planar areas with integral extensions from one or opposite sides formed as a number of separable filaments such that the filaments can be bunched to form a flexible light conducting cable. Except for light escape zones via which light can escape from the planar area or areas, and the distal ends of the filaments, the element is covered by an internally reflective cladding layer such as to enable propagation of light through the filaments from the light source and in the plane of the planar areas, which rather than being strictly planar can be curved into various shapes. The light escape zones may be formed by replacing the cladding layer in those zones by a transparent layer of higher refractive index than the material of the element, or by using a diffusive or phosphorescent layer to divert or reradiate light out of the plane of the element.

33 Claims, 3 Drawing Sheets

FIBRE OPTIC WAVEGUIDE ILLUMINATING ELEMENTS

BACKGROUND OF THE INVENTION

1. Field of the Invention

This invention relates to fibre-optic light conducting and emitting elements havbing waveguide characteristics.

2. Review of the Art

In recent years, fibre-optic light conducting waveguide elements have been widely used for the transmission of light along extended paths for various purposes ranging from communication utilizing modulated light, illumination of zones at a distal end of or alongside such an element, observing or monitoring locations at a distal end of the element, and decorative applications. For most applications, elongated fibres are utilized which have a light conducting core surrounded by a cladding layer of sufficiently lower refractive index and thickness to ensure, under intended conditions of use, total internal reflection of light passing along the fibre core, thus avoiding light from escaping from the fibre and being lost. In some cases, escape of light from the fibre is desired, as in couplers in which light is transferred between generally parallel fibres, and in this case the cladding may be locally reduced in thickness or removed. The refractory index profile of the fibre is not necessary stepped as between the core and the cladding, but may be graded in various ways to provide the fibre with desired transmission properties.

Various proposals have been made for the use of optical fibres to illuminate signs of various types. In the most common type, a bundle of optical fibres is utilized to connect a light source to distributed points on a panel, the light escaping from the ends of the fibres. Representative of such arrangements are those disclosed in U.S. Pat. Nos. 2,507,909 (Kaysen), 2,639,528 (Ochsner), 3,489,482 (Brill), 3,962,702 (Kriege), 4,141,058 (Mizohata et al) 4,417,412 (Sansom), United Kingdom Patent specifications Nos. 1,507,883 and 2,051,447, German Patent specification No. 3,509,663 discloses a room lighting system, U.S. Pat. No. 4,647,152 discloses an image transmission system, and U.S. Pat. No. 4,597,030 discloses a surgical illuminator, all operating on similar principles.

In U.S. Pat. No. 3,781,537 (Ramsey) parallel optical fibres attached together to form a ribbon are used as a light conductor to provide rear illumination of a sign panel. The surface of the ribbon is treated in some manner not fully discussed so that light escapes from the ribbon into the panel.

SUMMARY OF THE INVENTION

The present invention seeks to provide a fibre optic element capable of simple fabrication and versatile application in many different applictions in which light is too be conducted to destinations remote from a light source for example in cases where the provision of electrical wiring for illumination might be hazardous or expensive, or conventional electric light might cause unwanted or damaging heat generation. The elements may also be utilised as fibre optical communication and switching systems.

According to the invention in its broadest aspect, the invention provides a fibre optic element comprising a sheet moulded from synthetic plastic material having high light transmissivity, at least one edge of the sheet having a coplanar extension formed with grooves or slots dividing the extension into a plurality of separable flexible filaments extending longitudinally from said one edge of the sheet, and the sheet and extension being substantially covered, except for distal ends of said filaments and at least one area on at least one side of the sheet via which light can escape, by an internally reflective layer which constrains light entering the element through said filaments to propagate longitudinally of the filaments and in the plane of the sheet.

Preferably the element has extensions at opposite sides or is formed as an integral chain of such elements, the filaments of at least one end being bundled to provide a coupling to a small aperture light source.

The internally reflective layer is preferably a transparent layer of lower refractive index than that of the material of the element. The at least one area via which light may escape may be formed by a layer of higher refractive index, or by a diffusive or phosphorescent layer which diverts or reradiates light out of the plane of the sheet. This area may define indicia, graphics or decorative patterns.

Further features of the invention will become apparent from the following description of the preferred embodiments thereof.

SHORT DESCRIPTION OF THE DRAWINGS

DESCRIPTION OF THE PREFERRED EMBODIMENT

Elements in accordance with the invention are typically fabricated from thin sheets or tapes of highly transparent synthetic plastic resin such as the polymethyl methacrylate resins sold under the trade marks LUCITE and PERSPEX. These materials are thermoplastic, and a sheet extruded or otherwise formed from them can be reformed by a further moulding process. In the present instance, each surface of the sheet 1 (see FIG. 1) is coated or laminated with a layer 2 of material having properties such that it prevents the escape from the sheet of light travelling generally in the plane of the latter, and causes such light to propagate in that plane. Such a layer 2 is typically of material having a lower refractive index than the material 10 (see Figure 1A) of the sheet, such as a material utilized for cladding plastic optical fibres, in which case the layer may itself be transparent to light propagating at a substantial angle to the plane of the sheet. Suitable materials for the cladding layer are polyvinyl alchols, and polyaerylates of lower retractive index than the core material. It may also be a reflective layer, as may be produced by metallization of the surface of the sheet.

Figure 1:
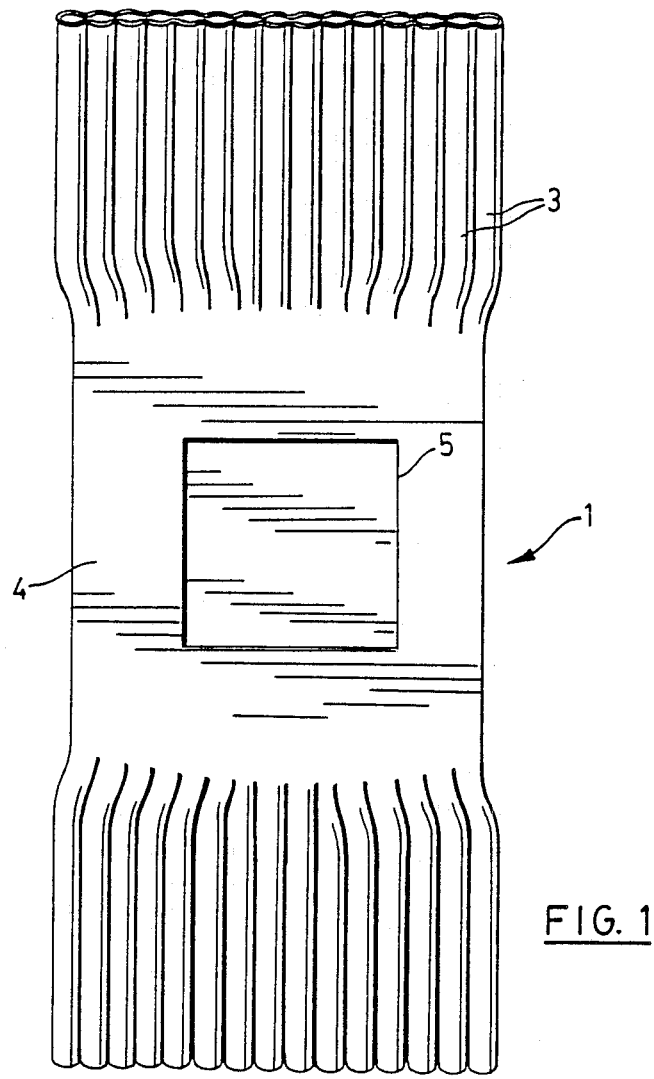
FIG. 1 shows a first embodiment of a fibre optic element according to the invention, with end filaments of the element shown disproportionately short for convenience in illustration.
Figure 1A:
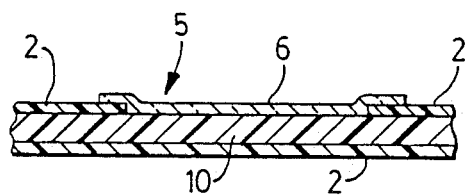
Figure 1A is a fragmentary section through part of the central portion of the element of FIG. 1.

The laminated sheet may be formed into an element in accordance with the invention, for example by passing it between suitably configured heated rollers, so as to form opposite end portions of the coated or laminated sheet 1, into a number of parallel separable filaments 3 which are preferably more or less cylindrical as shown in FIG. 1, with a gradual transition at their inner ends to a square cross-section until they merge with a central generally planar portion of the sheet. The terms generally planar in the context of this specification mean that any small area of the sheet has approximately flat and parallel surfaces, and although the sheet as a whole may be curved, the radius of curvature is sufficiently large compared to the thickness of the sheet that it will still act as a waveguide for light travelling in its general plane.

The formation of the filaments 3 from a laminated or coated sheet will result in the filaments being formed with a surrounding cladding formed by the layer 2, particularly if the layer 2 is selected to have an equal or somewhat higher tensile strength at the forming temperature, and the moulding elements are configured so that the filaments are almost or completely severed from one another (although not of course from the central portion 4 of the sheet). Rather than applying the layers 2 prior to moulding, these may be applied after moulding by any suitable process such as spraying or dipping, or plating if a metallization layer is to be applied.

At least part of the layer 2 is absent from at least one side of the sheet 1 in the central portion 4, typically to form indicia such as letters, numerals, graphics or patterns. In the case of a laminated structure, the layer 2 may be preformed with appropriate cut out areas 5, or these areas may be formed subsequently by locally abrading, embossing or otherwise disrupting the layer so as to destroy its totally internally reflective characteristics. In order to promote the escape of light, these areas may be covered by a transparent layer of refractive index higher than that of the sheet material. In some cases, the area may be formed by causing the numerical aperture of the sheet to be locally modified such that the cut-off wavelength for the propagation of light through that area falls in or below the visible spectrum, and light selectively escapes from the area according to its wavelength. On a similar principle, it is possible to inhibit propagation of light of certain wavelengths by local control of the numerical aperture of the element so as to provide filtering characteristics according to the well known principles applicable to optical waveguides.

Rather than apply the layer 2 prior to moulding of the sheet, it may be applied afterwards, in which case the area 5 may be formed by the use of masks or other conventional means to prevent deposition of the layer in area 5. After removal of the masks, a further layer 6 (see FIG. 1A) may be applied to the area 5. This layer may be transparent, and have a refractive index either higher than that of the sheet to promote the escape of light therefrom, or lower than the sheet but higher than that of the layer 2, selected so as to locally modify the numeric aperture of the sheet and promote the escape of light above a cut off wavelength. Alternatively, the layer 6 may be of light diffusive and preferably phosphorescent material to re-emit light either through the sheet so that it escapes through the opposite side, or from the layer 6 outwardly.

Figure 3:
FIG. 3 is a plan view which shows how multiple elements can be formed as a continuous daisy chain.

Although FIG. 1 shows an element with a single sheet portion 4 and filaments 3 at each end, numerous variations are possible. Thus as shown in FIG. 3, an elongated element may be formed with alternating flat portions 4 and filamentary portions 7. Such an element may be formed as a continuous band, to be cut to any desired length. Alternatively, an element as shown in FIG. 1 may be formed as a continuous band extending in the transverse direction, and cut to the width required for a display of desired length.

The sheet portion 4 need not be flat; instead it can be flexed or moulded to any desired contour (see FIGS. 4–6 described below) provided that the curvature is not so severe so as to interrupt light propagation in the plane of the sheet.

Figure 2:
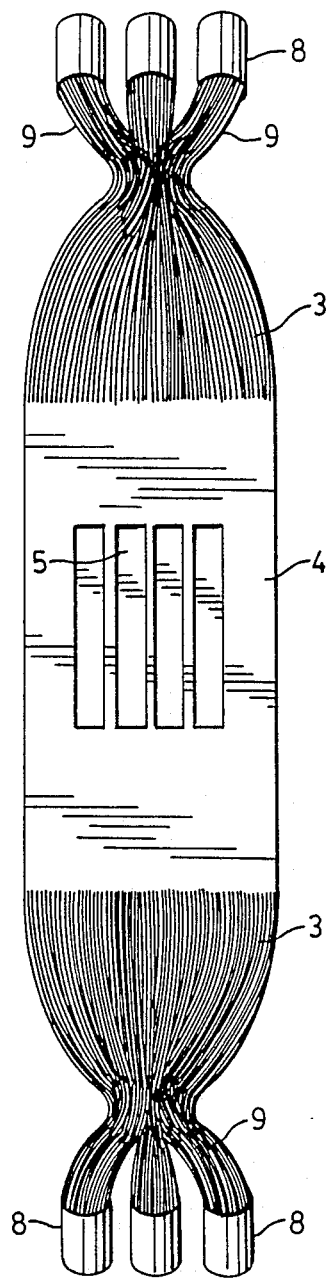
FIG. 2 shows an element according to the invention adapted for coupling to multiple light sources and/or other similar elements.

Referring to FIG. 2, the filaments 3 of at least one end of the element will normally be bunched together by a ferrule 8 or similar device for coupling to a small aperture light source, which may be either an electric or other lamp, or the end of a light conducting fibre optic cable. In the example shown, the filaments are separated at each end of the element into several groups or bunches 9 for separate coupling to a light source or other serially connected elements. By selectively illuminating light sources connected to different groups, and suitably segregating the filaments to be grouped, different portions of the sheet may be selectively illuminated, or the sheet as a whole may be selectively illuminated in different colours. For example, with three bunches 9 connected to red, green and blue light sources of controllable intensity, it is possible to illuminate a light escape area 5 in any colour.

Figure 2A:
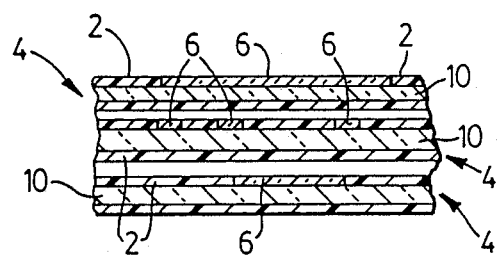

Assuming use of transparent layers for the layers 2 and the layers 6 forming the light escape areas, it is also possible for an element as shown in FIG. 2 to consist of multiple superimposed sheets as shown in FIG. 2A, with their end filaments separately bundled so that different indicia formed by escape areas 5 on different sheets may be selectively illuminated individually or in combination to provide a sign capable of multiple, easily changed displays.

Figure 4:
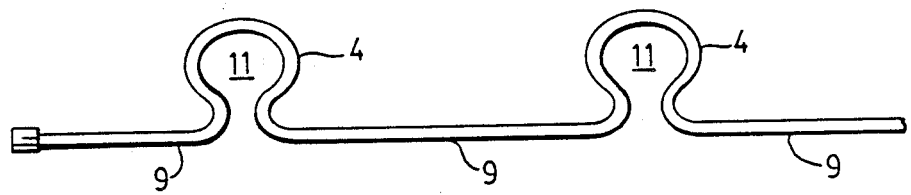
FIG. 4 is an edgewise view illustrating one manner in which the sheet portion of an element may be curved to provide a shaped display surface.

FIG. 4 shows one way in which an element according to the invention can be utilized to provide a chain of lamps, as for decorative purposes. A chain as shown in FIG. 3 has its portions 4 formed into peninsular loops, with the intervening filaments 3 (see FIG. 1) formed into bunches 9 which formed light transmitting cables between the lamps. The lamps are formed by light escape areas via which light escapes from the exterior of the loops 11. A ferrule 8 on one or both ends of the assembly is coupled to a light source to illuminate the lamps.

Figure 5:
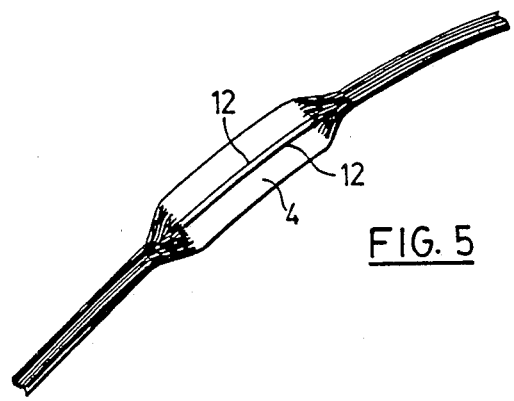
FIG. 5 is a perspective view illustrating one manner in which the sheet portions of a daisy chain of elements may be formed into cylindrical bodies.

FIG. 5 shows a further way in which an element according to the invention can be utilized to form a chain of lamps. In this case the portions 4 are wrapped into cylinders with their free edges overlapping or abutting, and the filaments 3 are again formed into bunches 9.

Figure 6:
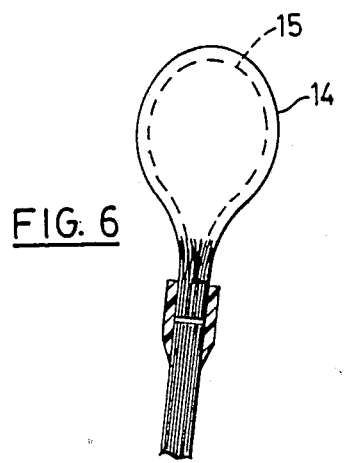
FIG. 6 is a perspective view illustrating one manner in which the sheet portions of an element in accordance with the invention may be formed to define a part spherical body.

FIG. 6 shows an element with its portion 4 moulded into a light bulb shape 14, with its edge at the base of the bulb formed into integral filaments again bunched to form a cable 9. The light escape area is formed by replacing a transparent layer of lower refractive index than the material of element over the inside surface of the bulb 14 by a phosphor layer 15 which absorbs light conducted into the bulb from a remote source by cable 9, and re-emits it through the outer surface of the bulb. Alternatively the bulb may be filled with a liquid, a gel, or a solid resin material 20, which may be coloured and have a refractive index equal to or higher than that of the bulb itself. The cable 9 may be quite short, and formed into a spigot 16, for insertion into a socket 17 at the end of a light guide 18.

I claim:

1. A fibre optic element comprising a sheet moulded from synthetic plastic material having high light transmissivity, two opposite edges of the sheet each having a coplaner extension formed with grooves or slots dividing the extensions into a plurality of separable flexible filaments extending longitudinally from said edges of the sheet, and the sheet and extension being substantially covered, except for distal ends of said filaments and at least one area on at least one side of the sheet via which light can escape, by an internally reflective layer which constrains light entering the element through said filamwents to propagate longitudinally of the filaments and in the plane of the sheet.

2. A fibre optic element comprising a sheet moulded from synthetic plastic material having high light transmissivity, at least one edge of the sheet having an integral coplanar extension moulded with slots dividing the extension into a plurality of separable generally circular flexible filaments extending longitudinally from said one edge of the sheet, and the sheet and the extension being substantially covered, both on their outer surfaces and within the slots, save only for distal ends of said filaments and at least one area on at least one side of the sheet via which light can escape, by an internally reflective layer which constrains light entering the element through said filaments to propagate longitudinally of the filaments and in the plane of the sheet, means being provided adjacent and coextensive with said at least one area to promote the escape of light through said area.

3. A fibre optic element according to claim 2 wherein a coplanar extension as set forth in claim 2 is integrally formed at two opposite sides of the sheet.

4. A fibre optic element according to claim 1, wherein strands of coplanar extensions of adjacent elements are linked to form an integral chain of such elements.

5. A fibre optic element according to claim 1, wherein the separable filaments are separated and bunched to form at least one multi-fibre light guide for coupling to a small aperture light source.

6. A fibre optic element according to claim 1, wherein the separable filaments of at least one of said extensions are separated and bunched to form a multi-fibre light guide joined to a similar multi-fibre light guide formed by the extension of a further adjacent element.

7. A fibre optic element according to claim 1, wherein the grooves are shaped such that the separable filaments have a substantially cylindrical cross-section, with a gradual transition into the generally planar sheet.

8. A fibre optic element according to claim 1, wherein the area via which light can escape has a translucent coating having a refractive index higher than that of the sheet, such that light passing through the sheet can escape therethrough.

9. A fibre optic element according to claim 1, wherein the internally reflective layer is formed at least in part of transparent material having a refractive index lower than that of the sheet.

10. A fibre optic element according to claim 9, wherein the area via which light can escape is formed by a phosphorescent material which re-emits light through the opposite surface of the sheet.

11. A fibre optic element according to claim 5, wherein filaments are formed into a plurality of bunches for coupling to different light sources.

12. A fibre optic element according to claim 5, wherein the sheets of several elements are superimposed, and filaments of an extension of each sheet are bundled into plural bunches for coupling to different light sources, whereby indicia formed by the light escape areas of the sheets can be selectively illuminated in desired superimposed combinations.

13. A fibre optic element according to claim 1, wherein the sheet is curved so as to form a peninsular loop.

14. A fibre optic element according to claim 1, wherein the sheet is curved so that its surface defines at least a part cylinder.

15. A fibre optic element according to claim 1, wherein the sheet is curved to define a part spherical body.

16. A fibre optic element according to claim 1, wherein the sheet is curved to form a closed body filled with a translucent material having a refractive index equal to or higher than that of the material of the sheet.

17. A fibre optic element according to claim 9, wherein the relative refractive indices and dimensions of the material of at least one of the sheet and the filaments, and their cladding layer, are at least locally such as to provide a numerical aperture which provides a propagation cut-off wavelength in the visible spectrum, whereby propagation is restricted to light below the cut-off wavelength.

18. A fibre optic element according to claim 17, wherein the area via which light may escape is a zone of the sheet in which propagation is so restricted, permitting light of longer wavelengths to escape from the sheet.

19. A lamp, comprising a sheet of transparent material curved so that its surfaces form inner and outer surfaces of a hollow body, with the radius of curvature of the sheet being very large compared with the thickness of the sheet, at least one edge of the sheet at an extremity of the body being extended into a plurality of integral elongated filaments grouped in parallel to form a light guide, the sheet and the filaments being covered, except for distal ends of said filaments and at least one area on at least one side of the sheet via which light can escape, by an internally reflective layer which constrains light entering the element through said filaments to propagate longitudinally of the filaments and parallel to the surface of the sheet.

20. A lamp according to claim 19, wherein the hollow body is substantially cylindrical.

21. A lamp according to claim 20, wherein the hollow body has a cylindrical axis parallel to the filaments.

22. A lamp according to claim 20, wherein the hollow body has a cylindrical axis perpendicular to the filaments.

23. A lamp according to claim 19, wherein the hollow body is a bulb, and the filaments are bunched to form a neck of the bulb.

24. A lamp according to claim 23, wherein the bunched filaments form a spigot for insertion into a socket at an end of a light guide.

25. A lamp according to claim 19, wherein the area of the sheet via which light can escape is the inside surface of the body.

26. A lamp according to claim 25, wherein the inside surface of the body is provided with a phosphor layer.

27. A lamp according to claim 25, wherein the body is filled with a material having a refractive index at least equal to that of the material of the sheet.

28. A lamp assembly comprising multiple lamps according to claim 19, wherein the sheet forming the body of each lamp is extended into filaments at each end, the grouped filaments extending between adjacent body to form a chain of lamps.

29. A fibre optic element according to claim 2, wherein the means to promote escape of light through said area is a light diffusive layer on that surface of the sheet opposite the area.

30. A fibre optic element according to claim 2, wherein the means to promote escape of light through the area is a phosphorescent layer on that surface of the sheet opposite said area.

31. A fibre optic element according to claim 2, wherein the means to promote escape of light through said area is a translucent coating applied to said area and having a refractive index higher than that of the sheet.

32. A fibre optic element according to claim 2, wherein said sheet is smoothly curved to form an envelope enclosing a volume, and the at least one light escape area is on an exterior surface of the envelope.

33. A fibre optic element according to claim 2, wherein the slots are shaped so that the cylindrical filaments have a gradual transition to a square cross-section as they merge with the planar sheet.

* * * * *